(12) United States Patent
Lee

(10) Patent No.: US 6,378,663 B1
(45) Date of Patent: Apr. 30, 2002

(54) BRAKE MECHANISM FOR A WALKER

(75) Inventor: Charles Lee, Taipei Hsien (TW)

(73) Assignees: Apex Medical Corp., Taipei Hsien (TW); Essential Medical Supply, Inc., Winter Park, FL (US)

( * ) Notice: Subject to any disclaimer, the term of this patent is extended or adjusted under 35 U.S.C. 154(b) by 0 days.

(21) Appl. No.: 09/702,613

(22) Filed: Nov. 1, 2000

(51) Int. Cl.[7] .................................................. B60T 1/00
(52) U.S. Cl. ........................ 188/2 F; 188/2 D; 188/31; 188/19; 74/501.6
(58) Field of Search ........................... 74/501.6; 188/19, 188/20, 25, 26, 2 D, 2 F, 31

(56) References Cited

U.S. PATENT DOCUMENTS

| | | | | |
|---|---|---|---|---|
| 1,798,808 A | * | 3/1931 | Potter | 188/31 |
| 4,384,713 A | * | 5/1983 | Deutsch et al. | 272/70.3 |
| 5,984,334 A | * | 3/1999 | Dugas | 280/250.1 |
| 6,148,942 A | * | 11/2000 | Mackert, Sr. | 180/65.6 |
| 6,298,949 B1 | * | 10/2001 | Yang et al. | 188/20 |

* cited by examiner

Primary Examiner—Christopher P. Schwartz
Assistant Examiner—Xuan Lan Nguyen
(74) Attorney, Agent, or Firm—Rosenberg, Klein & Lee

(57) ABSTRACT

A brake mechanism for a walker, essentially comprised of a brake disk with toothed peripheral is provided on the side of the wheel, a brake base allows relative displacement, and toothed section on the inner side of the brake base, wherein, said brake base as pushed by an elastic member holds with its toothed section against the toothed peripheral of the brake disk to brake the wheel in normal status, a handle is used to manipulate a brake cable to pull the brake base so to release the brake; furthermore, a turning block in the shape of a turntable is provided to accommodate the same brake cable connecting both brake handle, the turning block is further connected to another two brake cables to synchronously activate the brake mechanisms for the RH and the LH wheels; by pulling either brake handle, the synchronous release or brake of both brake mechanism can be achieved while allowing a 2-step brake.

5 Claims, 13 Drawing Sheets

BRAKE MECHANISM FOR A WALKER

BACKGROUND OF THE INVENTION (a) Field of the Invention

The present invention relates to a brake mechanism for a walker, and more particularly to one that allows nodal brake or release the brake, two-step brake and synchronously release or brake both wheels by pulling either the right or the left handle.

(b) Description of the Prior Art

Whereas, the brake mechanism for a walker generally available in the market is adapted from that used on a bicycle. That is, a brake handle is connected with a wire in a brake so that once the brake handle is pulled, the wire is also pulled to brake the walker. Wherein, both of the right and the left brake handles are separately provided to achieve the respective control of the brake of the right and the left wheels.

An improved prior art provides synchronous brake applied to both of the right and the left wheels. Wherein, a brake lever extends from and integrated to both wheels to hold against or restrict the wheels in conjunction with the operation by a linkage type of single brake handle. Much more force from a user of the walker is required than that for the walker with separate brake handle.

A considerable amount of force is applied to brake a walker with the prior art of brake model. That could cause danger to the user who is usually in poor physical condition and slower in response in case of emergency.

SUMMARY OF THE INVENTION

The primary purpose of the present invention is to provide a brake mechanism for a walker, wherein by the side of each wheel of the walker is provided with a brake disk with toothed peripheral, and a brake base that can be displaced in relation to the brake disk. Two certain sections are toothed opposite to each other inside the brake base that is subject to the plunge by an elastic member with said toothed sections engaged to the teeth from the brake disk to brake the wheels under normal conditions. By operating a brake cable from a handle to pull the brake base, the brake is released for pushing forward the walker from improving the safety for the user of the walker.

Another purpose of the present invention is to provide a brake mechanism for a walker by having both of the right and the left handles connected with a cable to a turning block in the shape of a turntable. The turning block is connected to two brake cables for synchronously applying the brake mechanism of both wheels by pulling either brake handle to easily brake or release the walker.

Another purpose yet of the present invention is to provide a brake mechanism for a walker. Wherein, by the side of the right and the left wheels is each separately provided with a brake disk with toothed peripheral, and a brake base that can be displaced in relation to the brake disk. Toothed sections are provided inside the brake base, which is subject to the plunge by an elastic member with said toothed sections engaged to the teeth from the brake disk to brake the wheels under normal conditions. Furthermore, both RH and LH handles are connected to a turning block in the shape of a turntable with the same brake cable and the turning block is further connected with another two brake wires to synchronously operate both brake mechanisms of the RH and LH wheels. By means of such configuration, a two-step brake is achieved when either handle is pulled, the turning block turns and makes the toothed section at the bottom of the brake block to disengage from the peripheral teeth at the lower part of the brake disk thus to release the brake. Then the other handle is pulled to make the turning block to turn for an even greater angle. The brake base being subject to the pull is brought down for a greater distance so to allow the toothed section at the top of the brake base to hold against the peripheral teeth at the upper part of the brake disk and to brake the wheels once again.

DETAILED DESCRIPTION OF THE PREFERRED EMBODIMENTS

Figure 1:
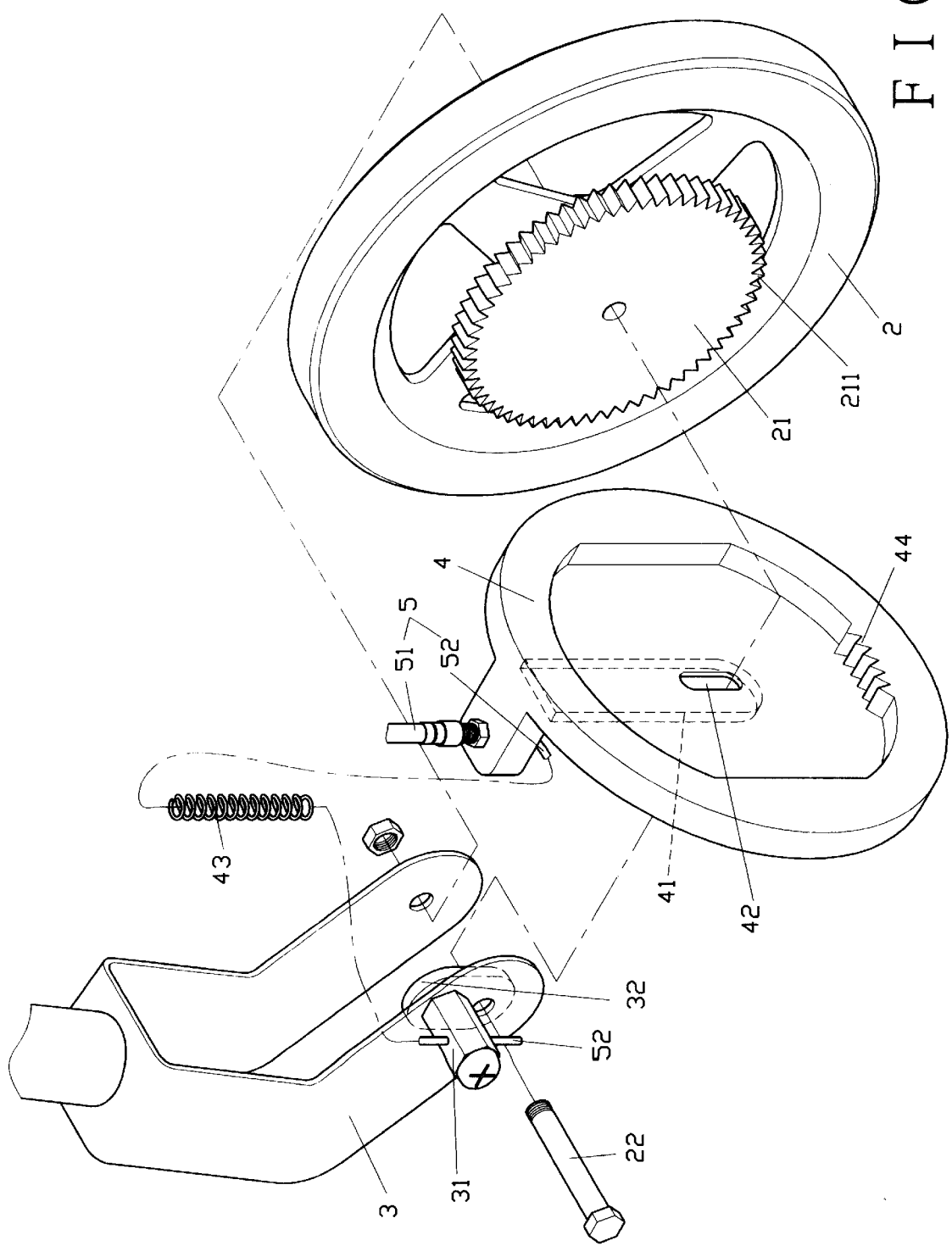
FIG. 1 is a schematic view showing a preferred embodiment of the present invention adapted to a walker.
Figure 2:
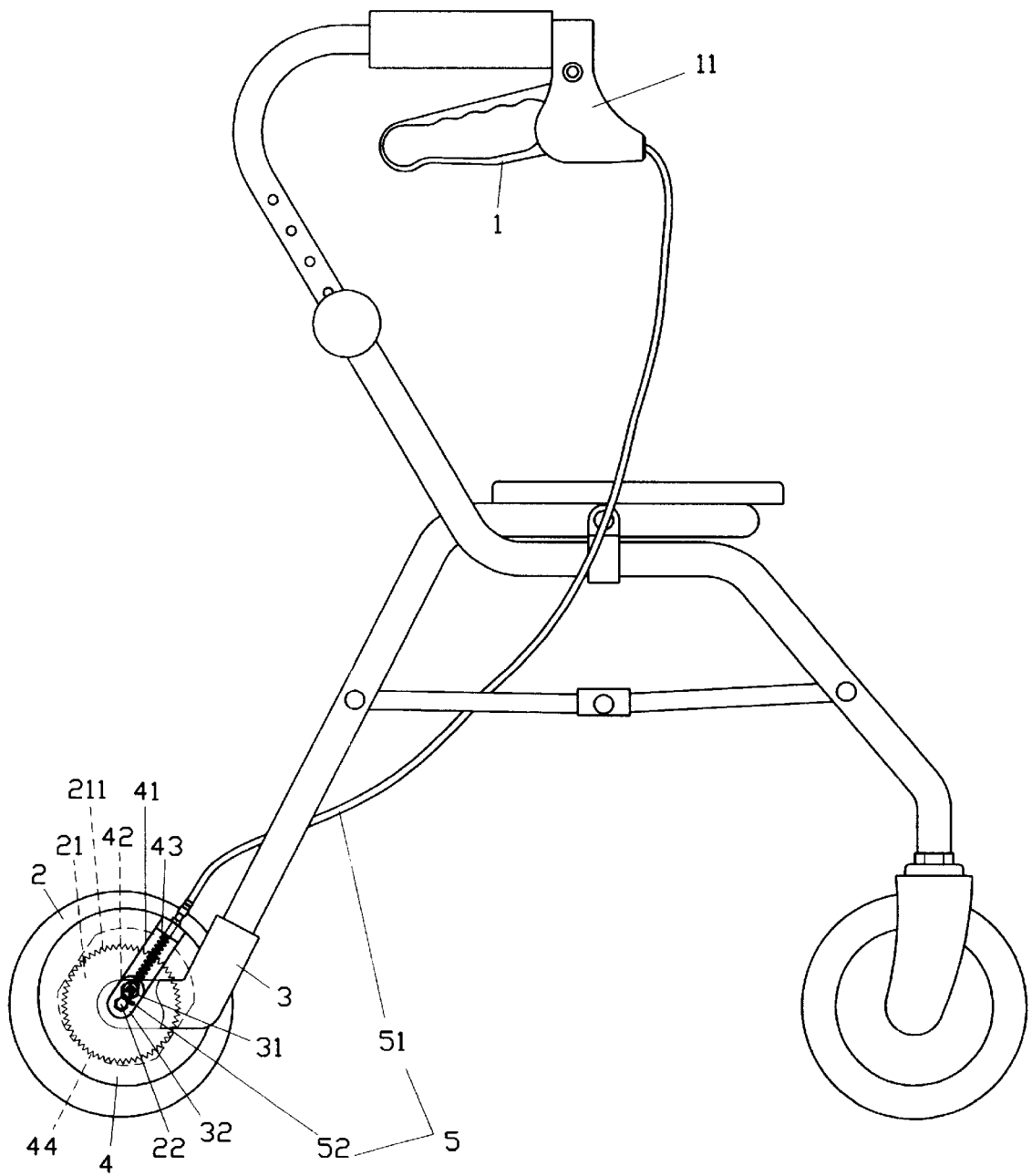
FIG. 2 is a schematic view of the structure of the preferred embodiment of the present invention.

As illustrated in FIGS. 1 and 2, a brake mechanism of a preferred embodiment of the present invention is applied in a configuration of having both brake handles (1) to respectively control both (rear) wheels (2), i.e. the brake mechanism provided to the RH wheel is identical with that to the LH wheel. Therefore, the same model is designed for respectively control the brake status on both wheels. The design for single side model is essentially comprised of a brake disk (21) is fixed by the side of the wheel (2), a brake base (4) is provided on the corresponding side of a wheel caliper (3) and a brake cable (5) in length greater than the linear distance between the brake base (4) and the brake handle (1). Within, Said wheel (2) and brake disk (21) is pivoted to the wheel caliper (3) with a shaft (22). Said brake disk (21) is formed with toothed peripheral (211) and a guide (32) is fixed at the inner side to the wheel caliper (3) with a fixing bolt (31). A recess(41) is formed in the brake base (4) facing the guide (32) and accommodates the insertion of the guide (32). A slit (42) provided through the shaft (22) on the brake base (4) allows the brake base (4) to travel in the restricted space in said recess (41) and slit (42) against the brake disk (21) for the wheel (2) pivoted to the wheel caliper (3), The bottom of the brake base (4) when subject to the plunge by an elastic member (43) holds against the lower edge of the brake disk (21) while a toothed section (44) provided at the bottom of the brake base (4) bites and is fixed in position by the toothed peripheral (211) of the brake disk (21). Furthermore, one end of the brake cable (5) is fixed to the brake base (4) with an outer wire (51). An inner wire (52) is made mobile and penetrates through the brake base (4) to be connected to the fixing bolt (31) on the wheel caliper (3), and the other end of the brake cable (5) is connected to the brake handle (1) as featured in the prior art of the present invention.

When the brake handle (1) is not yet applied, the wheel (2) is under its normal condition as illustrated in FIG. 2. Said brake base (4) is subject to the plunge by the elastic member (43) and held in position indicating an elevated status with its recess (41) and slit (42) in relation to the guide (32) and shaft (22) on the wheel caliper (3). Meanwhile, the tooth section (44) at the bottom of the brake base (4) holds against and bites in position the toothed peripheral (211) at the lower part of the brake disk (21) to brake the wheel (2).

Figure 3:
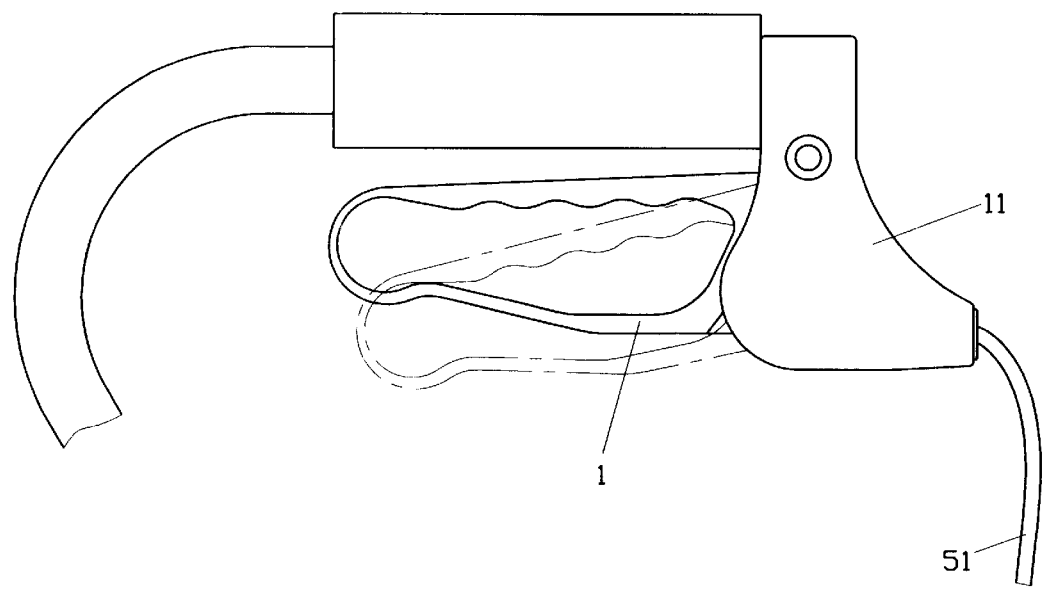
FIG. 3 is a schematic view showing the operation of the preferred embodiment of the present invention.
Figure 3:
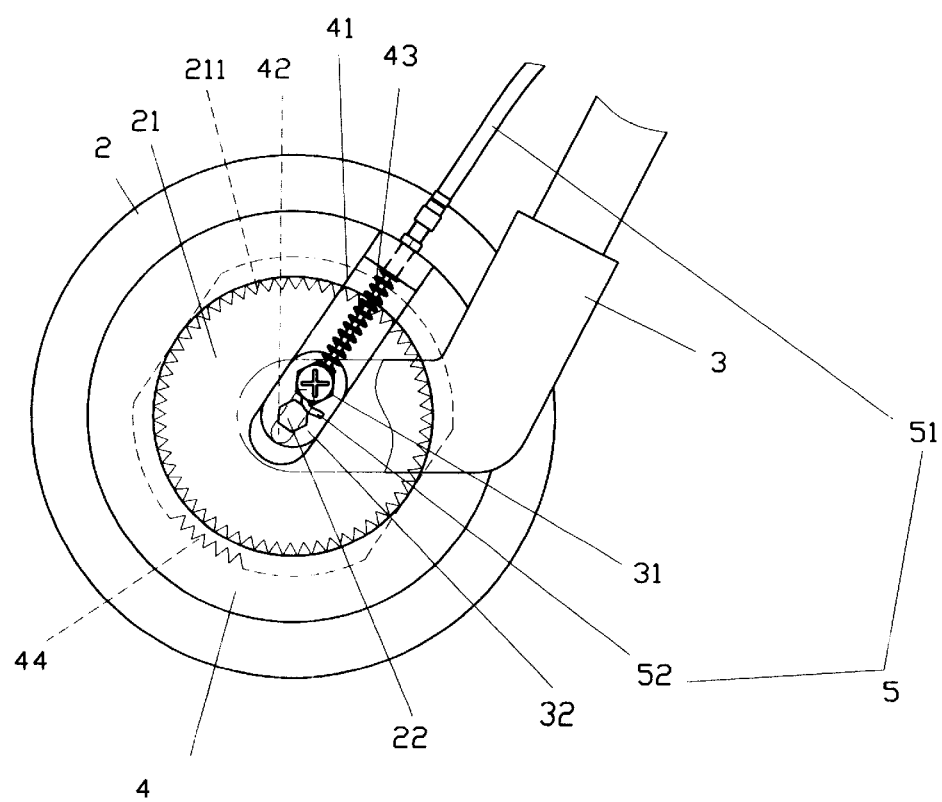

Now referring to FIG. 3, for the operation of releasing the brake from the wheel (2), the brake handle (1) is pulled, so that the inner wire (52) in the brake cable (5) is also pulled to relatively exert pressure on the end where the outer wire (52) holds against a pivot seat (11) of the brake handle (1). That puts the entire length of the outer wire (51) to create compression effect, resulting in a counter winding force to forthwith push with another end of the outer wire (51) against the brake base (4) to compress the elastic member (43). Consequently, both of the recess (41) and the slit (42) move downward in relation to the guide (32) and the shaft (22) for the toothed section (44) at the bottom of the brake base (4) to clear from the toothed peripheral (211) at the lower edge of the brake disk (21) and to release the wheel (2).

Figure 4:
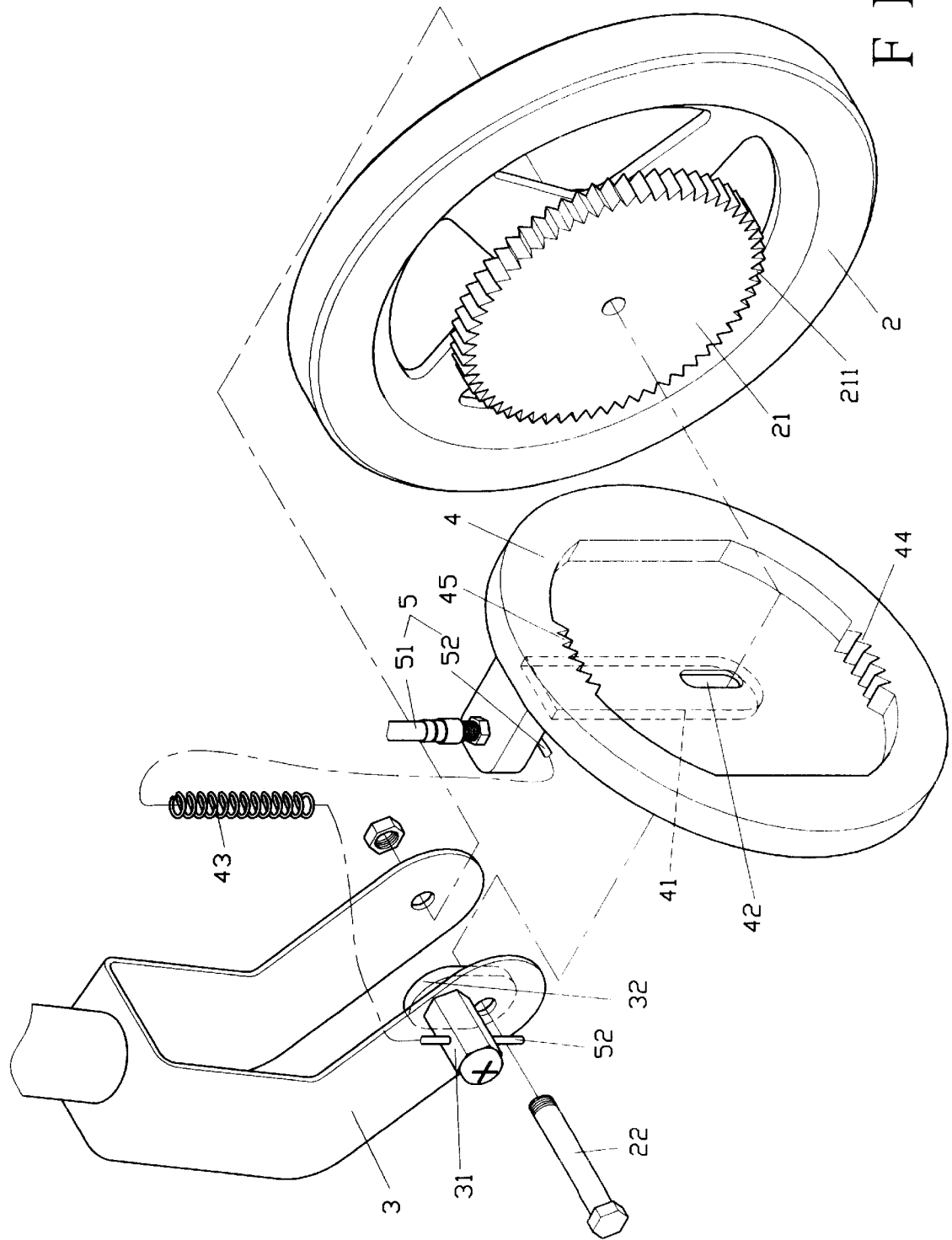
FIG. 4 is a schematic view showing a preferred embodiment of a changed structure of the present invention.
Figure 5:
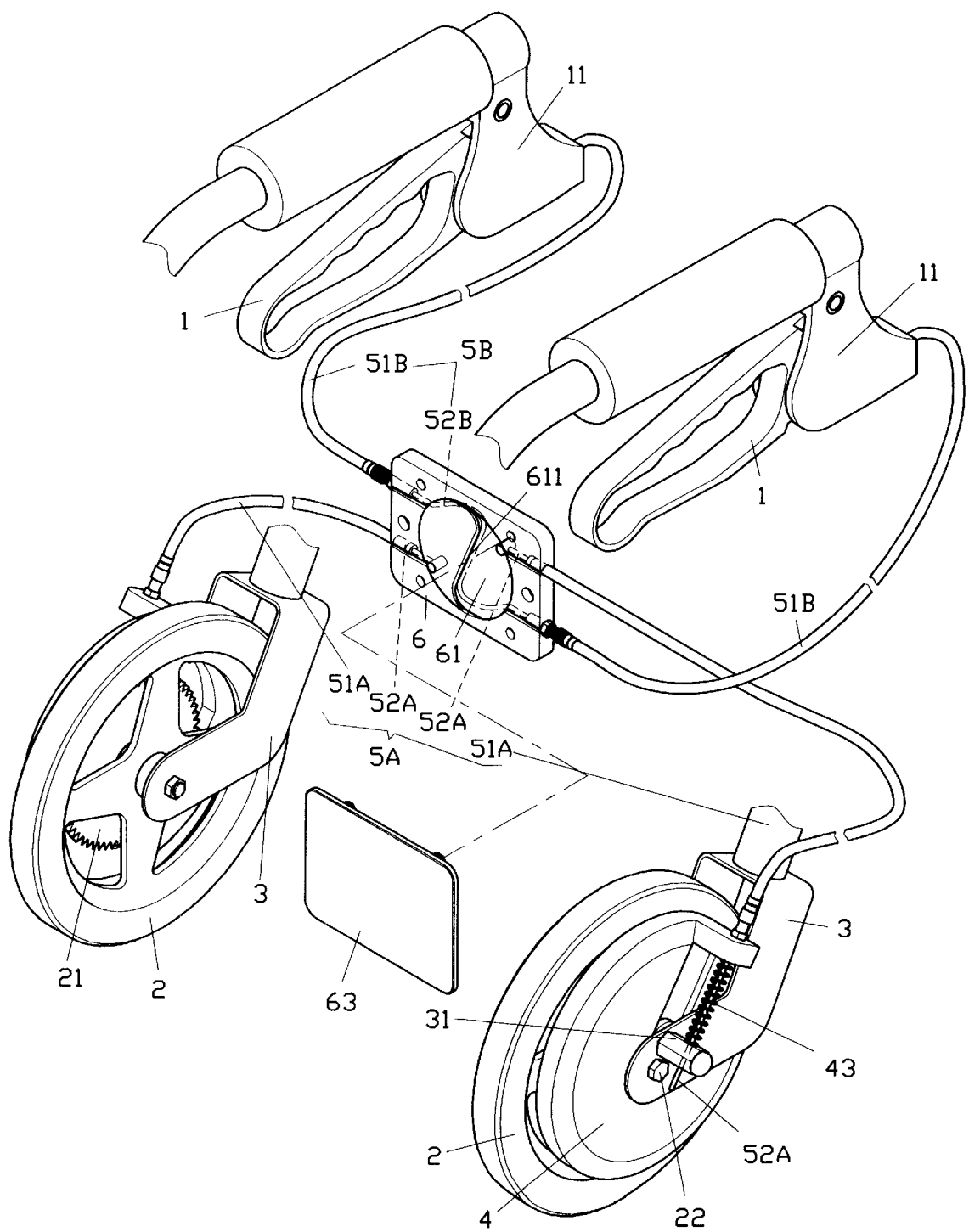
FIG. 5 is a schematic view showing the preferred embodiment of a changed structure of the present invention connected to a turning block.
Figure 6:
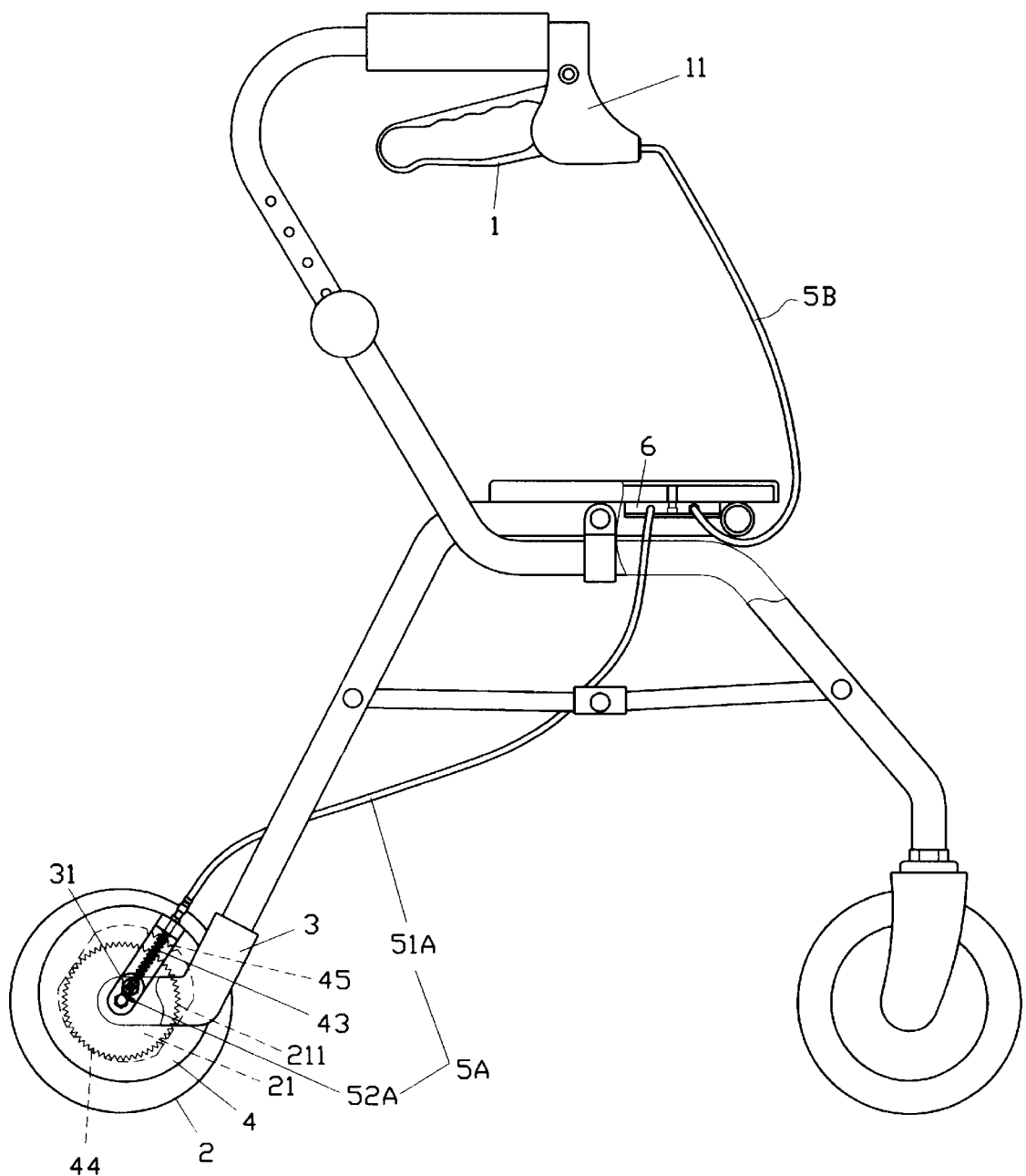
FIG. 6 is a schematic view showing an arrangement of the preferred embodiment of a changed structure of the present invention adapted to a walker.
Figure 7:
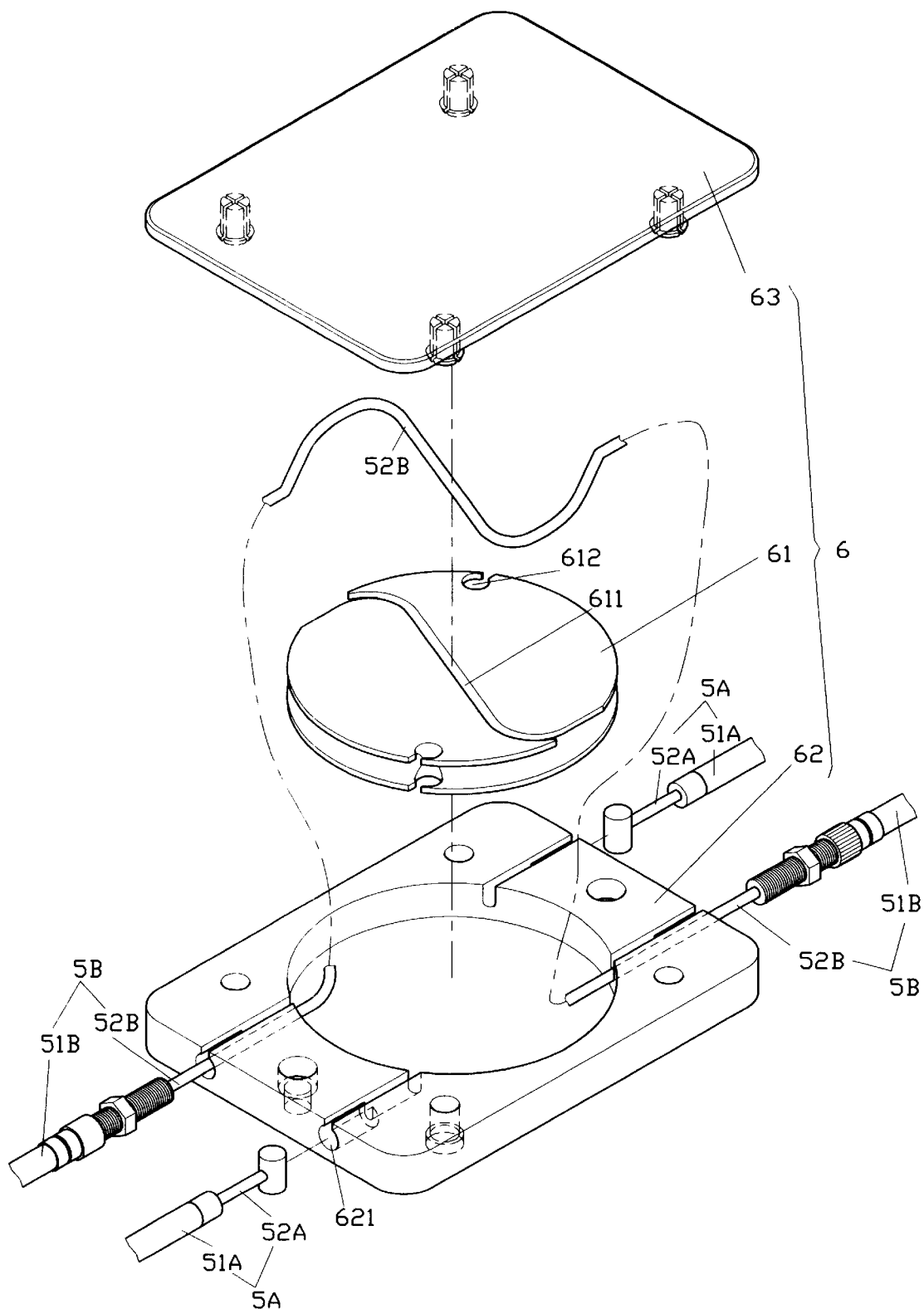
FIG. 7 is a view showing the breakdown of the structure of the turning block adapted to the preferred embodiment of a changed structure of the present invention.

The design disclosed in the preferred embodiment above is essentially applied in a configuration that both of the RH and LH brake handles separately control the RH wheel and the LH wheel, and the brake status of both wheels is released simply by pulling in the brake handle. However, with a turning block adapted to the brake mechanism at the wheel, different forms of preferred embodiment can be derived from the present invention. First referring to FIG. 4, wherein, another toothed section (45) is formed at the upper end of the brake base (4). When in the status that the relative brake base (4) is driven as described above, so that the toothed section (44) at the brake base (4) is disengaged from the toothed peripheral (211) at the lower end of the brake disk (21), said toothed section (45) is separated from the upper edge of the brake disk (21) for a certain distance (also referring to FIG. 8). As illustrated in FIGS. 5 and 6, a brake cable (5A) of the brake base (4) provided at where connected to both wheels (2) is connected to a turning block (51) of a turntable (6) and is driven by the turning block (61) rotating in a single direction. Another brake cable (5B) is provided between the brake handle (1) and the turning table (6). An inner wire (52B) is inserted through a groove (611) provided in the turning block (61) with both ends of the same cable connected to and as a linkage to both brake handles (1). That is, by pulling either brake handle (1), the brake cable (SA) from both brake bases (4) is drawn to control the brake status. Furthermore, the brake handle (1) can be made as to allow to be pulled in both ways and held position after the pull. FIG. 7 shows the detailed structure of the turntable (6). The turntable (6) is essentially comprised of a base (62) having the turning block (61) inside, the radial groove (611) in the turning block (61), a snap gap 612) each at both relatively crossing radial ends, four sockets (621) at both ends on both sides of the base (62), and a cover plate (63) with tenons.

Figure 8:
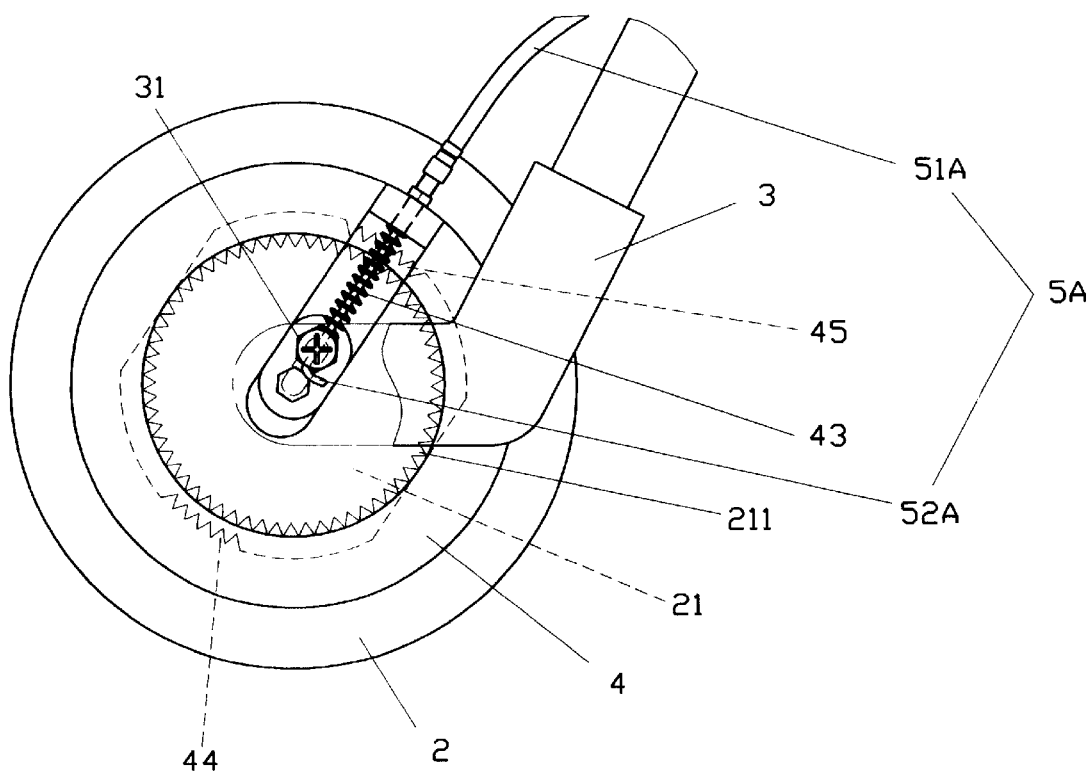
FIG. 8 is a schematic view showing the operation of the preferred embodiment of a changed structure of the present invention.

As illustrated in FIG. 8, the upper section of the brake cable (5B) connecting both of said RH and LH handles (1) is fixed to two said sockets (621) relatively at an inclination to both sides of the base (62) of the turntable (6). The connecting inner wire (52B) is inserted through the groove (611) in the turning block (61) to properly hold the wire (52B) in position.

The lower section of the brake cable (SA) connecting both of RH and LH brake mechanisms is fixed to another two of those four sockets (621) relatively at an inclination to both sides of the base (62) of the turntable (6). Their two inner wires (52A) further extend to be snapped into the respective snap gap (612) at both radial ends of the turning block (61).

Figure 9:
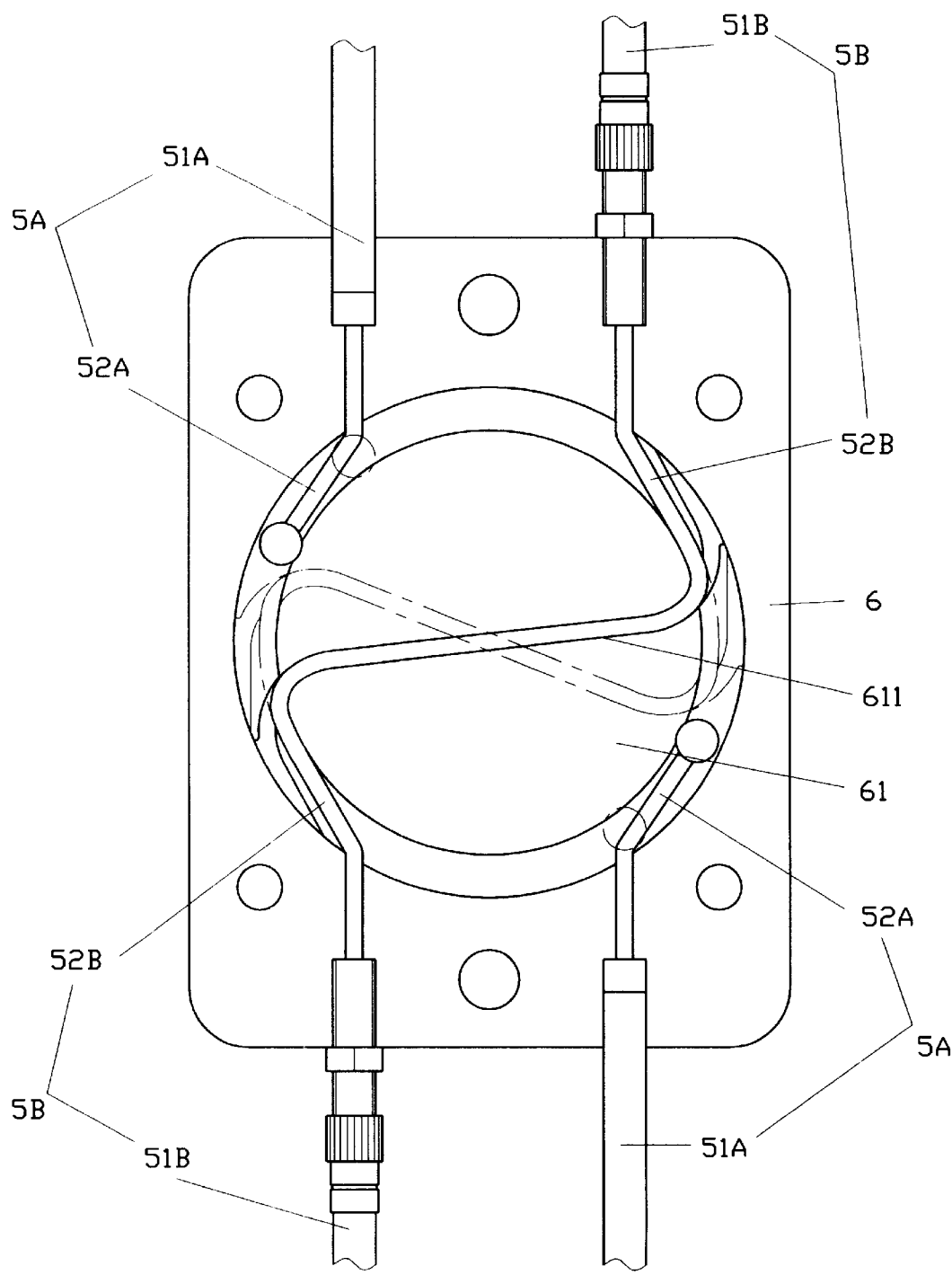
FIG. 9 is a schematic view showing the operation of the turning block adapted to the preferred embodiment of a changed structure of the present invention.

Once either brake handle (1) is selected to be pulled alone as illustrated in FIG. 9, the same inner wire (52B) connecting the upper section of the brake cable (SB) drives the turning block (61) for rotation. Wherein, the inner wire (52B) penetrating through the groove (611) of the turning block (61) instantaneously drive the turning block (61) to rotate since the head section of inner wire (52B) is pulled to hold against the groove (611). Both inner wires (52A) of the lower section of the brake cable (5A) connecting both RH and LH brake mechanisms are stretched due to the rotation in single direction by the turning block (61), thus the stretched inner wires (52A) controls the operation of both RH and LH wheels in conjunction with an outer wire (51A) to brake or release the brake.

Figure 10:
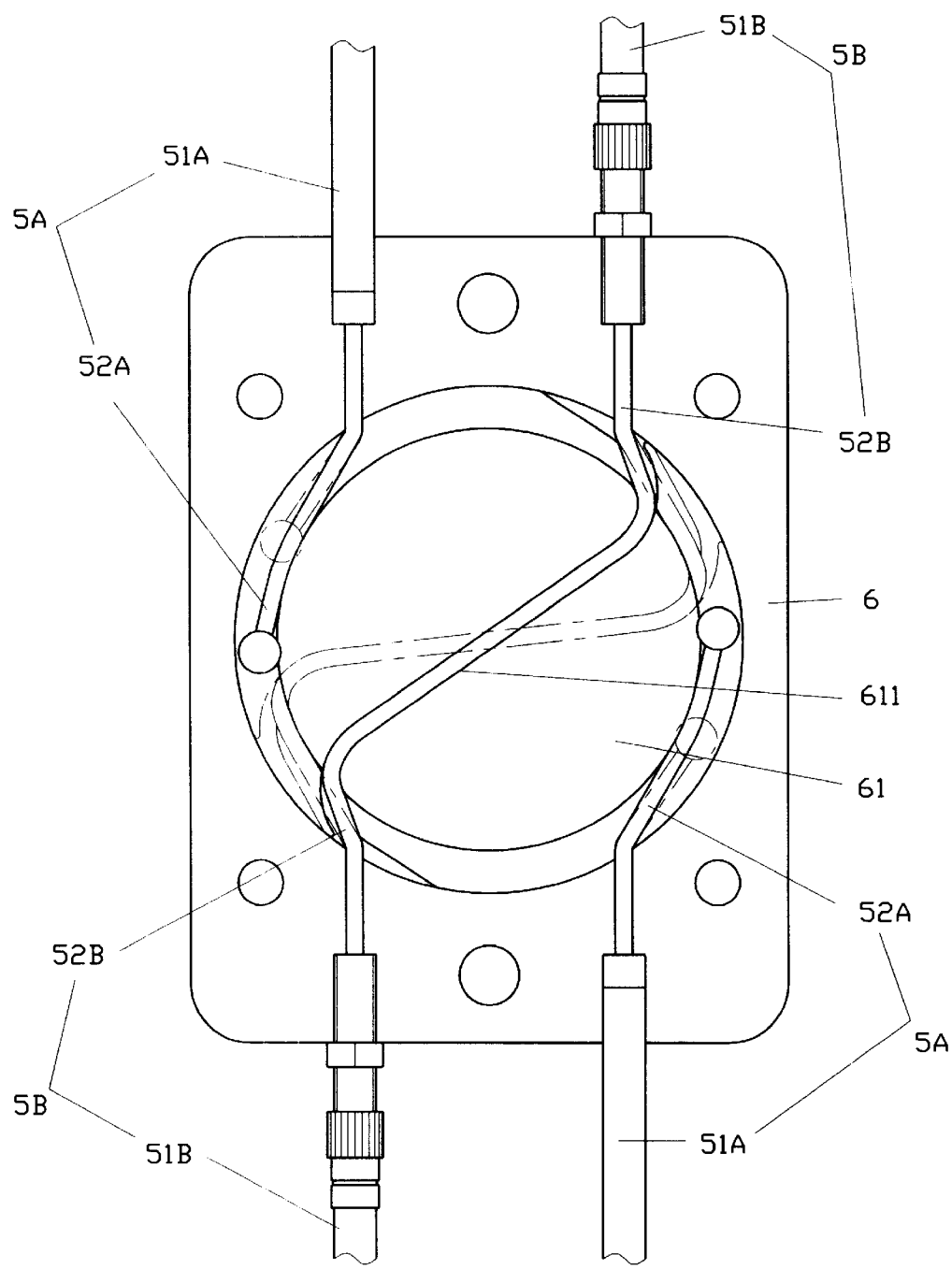
FIG. 10 is another schematic view showing the operation of the turning block adapted to the preferred embodiment of a changed structure of the present invention.
Figure 11:
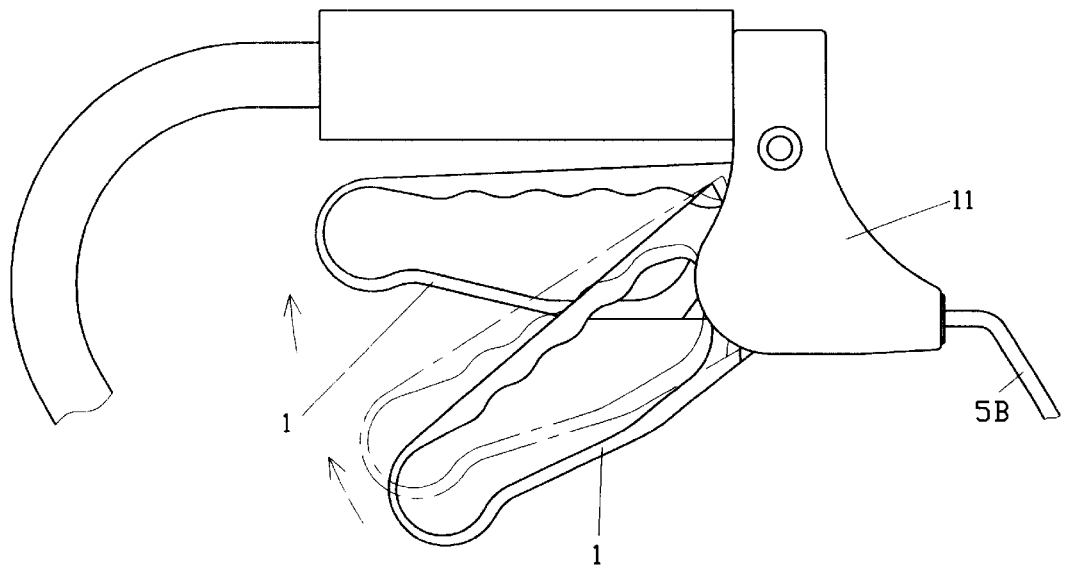
FIG. 11 is another schematic view showing the operation of the preferred embodiment of a changed structure of the present invention.
Figure 11:
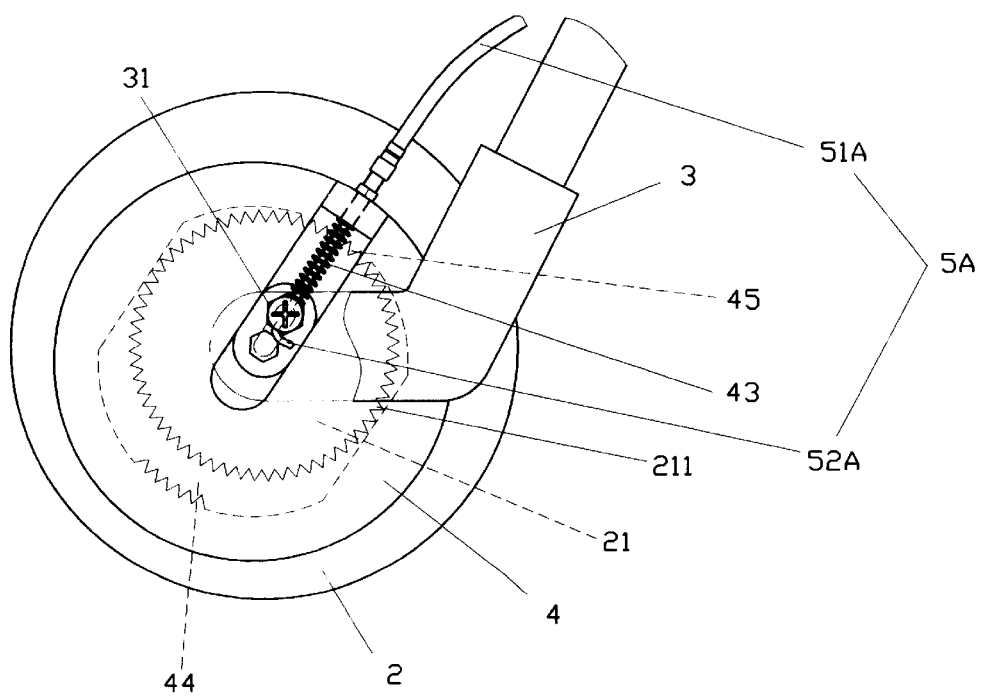

Furthermore, by applying the turntable (6) of the present invention to allow the operation of a single brake handle for the turntable (6) to rotate for a certain angle for synchronous control of both RH and LH brake mechanisms. Meanwhile, the inner wire (52B) inside the groove (611) of the turning block (61) is moved due to the rotation by the turning block (61). The rear section of the inner wire (52B) passing through the groove (611) is squeezed and compacted, resulting in that the force holding against the groove (611) by the inner wire (52B) is reduced because of being pushed back by its rear section. As a result, the distance traveled by the inner wire (52B) when pulled is not sufficient to completely drive the turning block (61) for relative rotation. The momentum is only enough for the turning block (61) to rotate for a certain degree just sufficient to operate the brake mechanism. Once the turning block (61) is driven and held in position, said rear section of the inner wire (52B) under compressed condition returns to its tension. Then as illustrated in FIG. 10, when the other brake handle is pulled, the rear section of the inner wire (52B) becomes an initial end of the pulling to rotate the turning block (61) once again. The resultant rotation degree for activating the brake mechanism for the second time. By such design, the turntable (6) of the present invention can be adapted to a 2-step brake mechanism as illustrated in FIG. 11. The rear section of the inner wire (52B) is made as an initial end of the pulling to once again rotate the turning block (61) of the turntable (6). Then, the turning block (61) of the turntable (6) is activated again for rotation, so that the brake base (4) being pushed by the outer wire (51A) of the lower section of the brake cable (5A) moves even lower. As a result, the toothed section (45) separately provided at the top of the brake base moves downward to hold against the toothed peripheral (211) at the upper edge of the brake disk (21) to brake the wheel (2).

Figure 12:
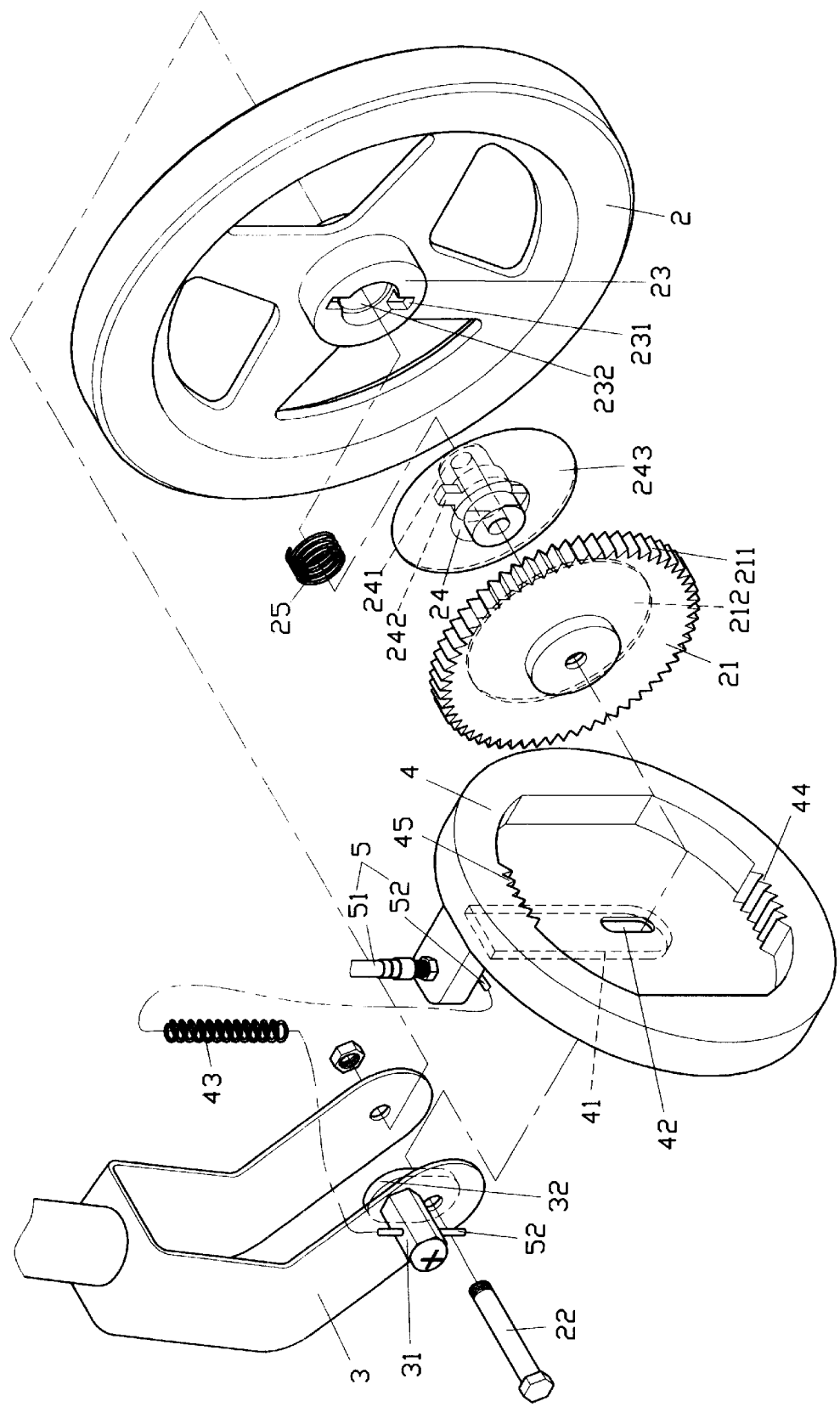
FIG. 12 is a schematic view showing the structure of a preferred embodiment of a changed brake disk of the present invention.
Figure 13:
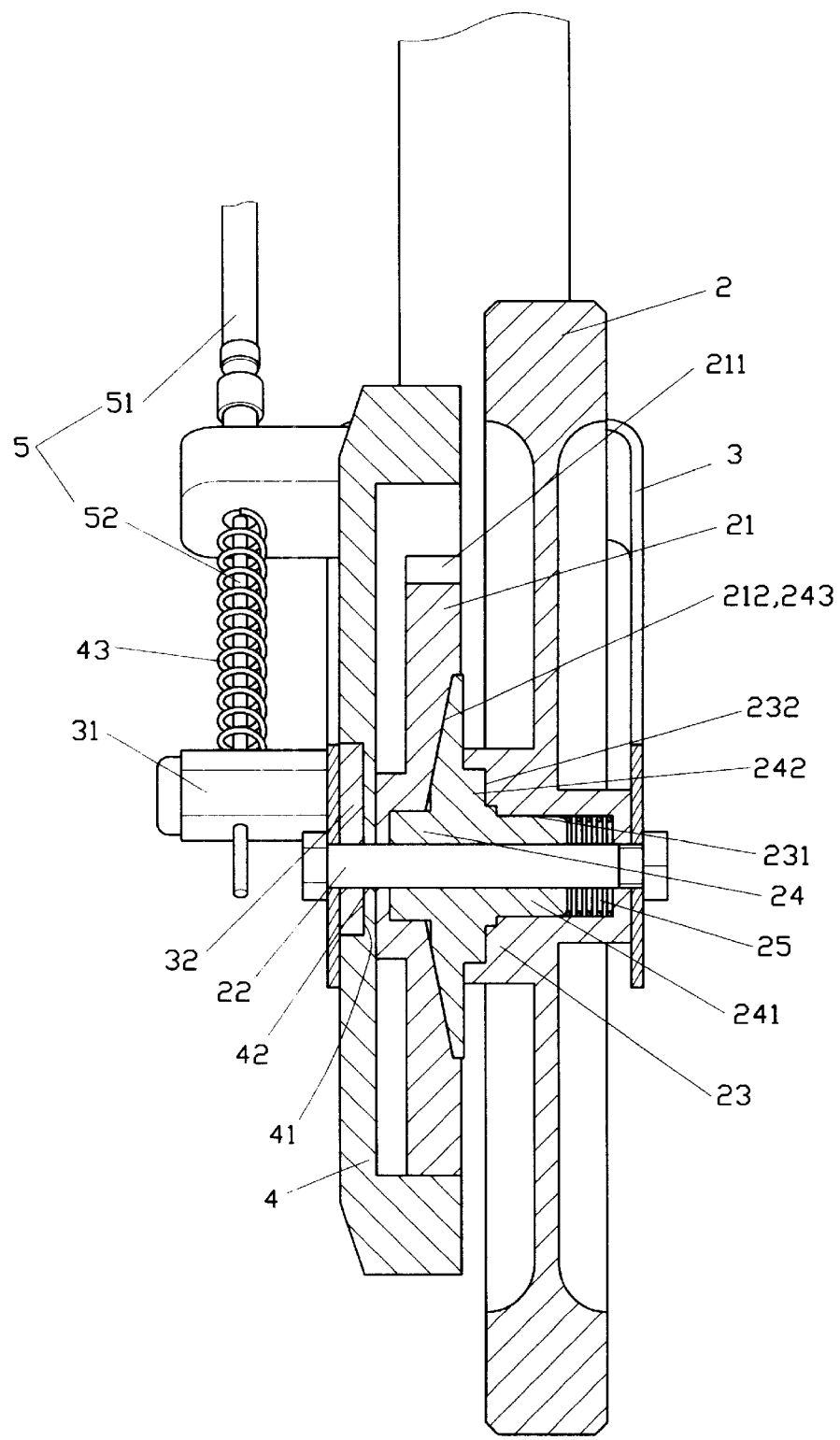
FIG. 13 is a schematic view showing an assembly of the preferred embodiment of a changed brake disk of the present invention.

However, if the brake handle is pulled to brake the walker while it is advancing, the toothed section (44) at the bottom of the brake base (4) will directly hold against and bite the toothed peripheral at the lower edge of the brake disk (21). The wheel (2) will be suddenly deadlocked, The present invention provides an improvement option as illustrated in FIGS. 12 and 13. Wherein, a joint disk (24) is provided between the brake disk (21) and a hub (23) of the wheel (2). A protrusion (242) and a gap (232) are respectively provided on a pin shaft (241) abutted into the wheel hub (23) and on the edge of a shaft hole (231) in relation to the joint disk (24). Both of said protrusion (242) and the gap (232) are provided for the joint disk (24) to be fixed in position at the hub (23) while preventing the hub (23) and the joint disk (24) from engaging in relative turning. An elastic member (25) is provided in the hub (23) to push in radial direction against the joint disk (24). A plane (243) at a certain inclination is formed on the side of the joint disk (24) facing the brake disk (21). A concave (212) is formed on the relative side of the brake disk (21) and binds the slant plane (243) on the brake disk (21) when subject to the push by the elastic member (25). As a limited turning for the joint disk (24) fixed to the brake disk (21) in relation to said wheel (2) is allowed, the wheel (2) is capable of having a mild turning before being braked even the wheel is deadlocked.

I claim:

1. A brake mechanism for a walker, essentially comprised of a brake disk fixed onto the side of a wheel of the walker, a brake base on the relative side of the wheel frame, a brake cable having its length longer than the linear distance between the brake base and a brake handle characterized by that the wheel fixed with the brake disk is pivoted to the wheel frame with a shaft, the brake base moving against the brake disk on the relative side of the wheel frame, an elastic member pushing against the brake base so that its bottom holds against the lower edge of the brake disk, the brake cable is fixed to the brake base with an outer wire at one end, an inner wire penetrates the brake base for it to be connected in position to the wheel frame, and another end of the brake cable is connected to a brake handle so that once the inner wire inside the brake cable is pulled as the brake handle is pulled, the outer wire is squeezed and compressed to create at another end a force of counter winding to cause the brake base moving downward for its bottom to clear away the lower edge of the brake disk, thus to release the brake to the wheel.

2. The brake mechanism for a walker as claimed in claim 1, wherein, a guide is fixed in position to the inner side of the wheel frame with a bolt, a recess is formed at the inner surface of the brake base to receive the guide, a slit is provided to adapt the insertion by a shaft, so to allow said brake base a limited displacement in relation to the brake disk in a space defined by said slit and recess, and the inner wire of the brake cable is fixed to the bolt.

3. The brake mechanism for a walker as claimed in claim 1, wherein, a toothed section is provided at the bottom of the brake base where holds against the lower edge of the brake disk, and the peripheral of the brake disk is also toothed to engage said toothed section.

4. The brake mechanism for a walker as claimed in claim 1, wherein, another further section on the top end of the brake base is located at a predetermined distance from the upper edge of the brake disk.

5. The brake mechanism for a walker as claimed in claim 1, wherein, a joint disk provided between the brake disk and a hub of the relative wheel is held in position at the hub, the joint disk is prevented from relative turning and is pushed by an elastic member in radial direction, a plane with a certain inclination is formed on the side of the joint disk facing said brake disk, and a concave is formed on the relative side of the brake disk to hold against the slant plane when the brake disk is pushed by said elastic member, so that the brake disk remains capable of completing a limited turning in relation to the wheel.

* * * * *